March 3, 1959 J. P. RUTH 2,876,080
APPARATUS FOR TREATING GASES
Filed Jan. 17, 1957 2 Sheets-Sheet 2

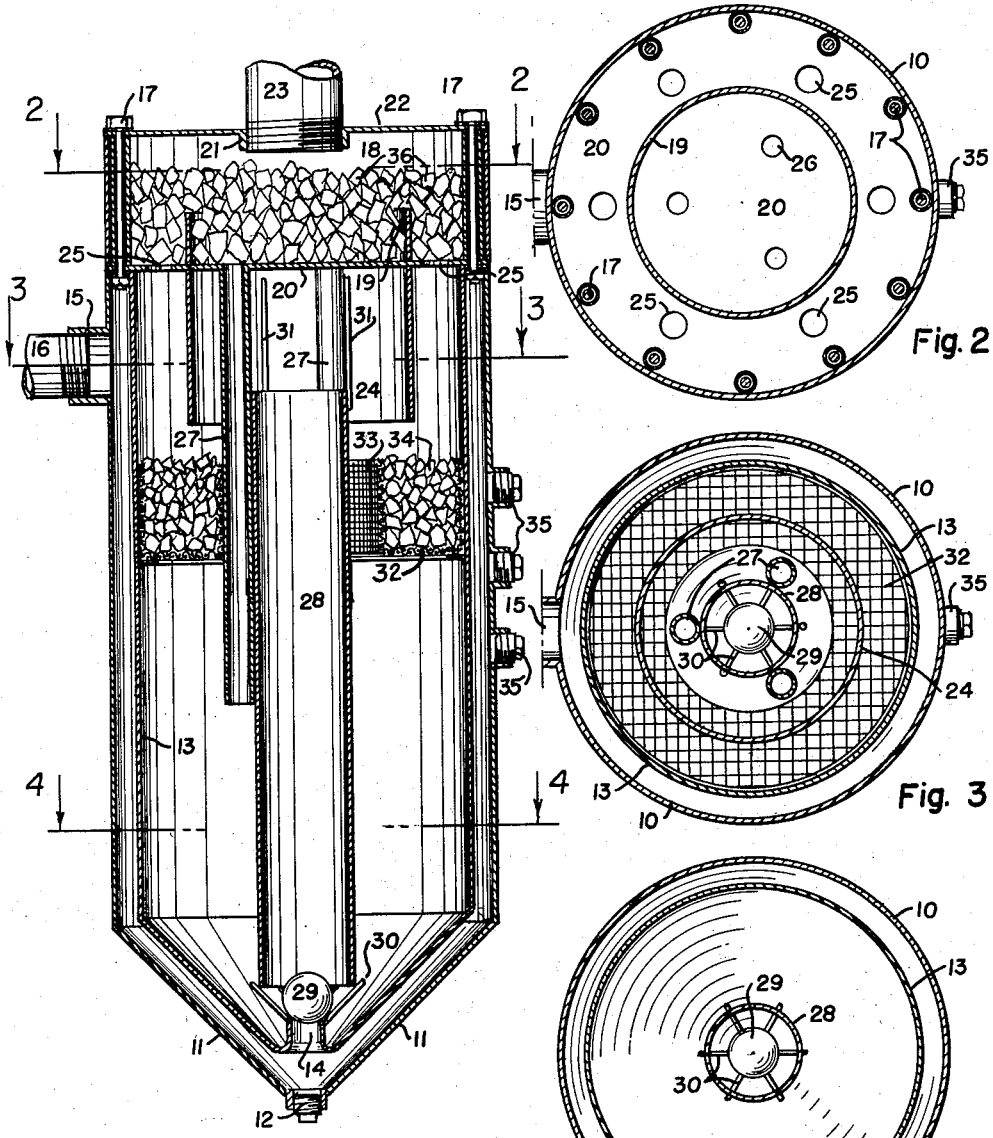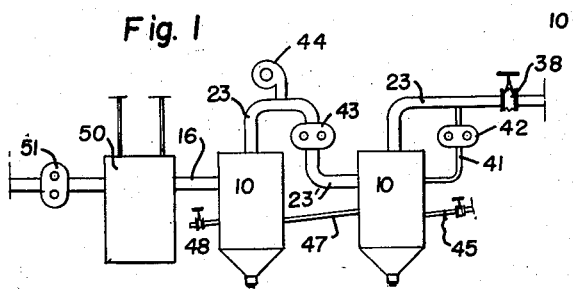

INVENTOR:
Joseph P. Ruth.
BY
ATTORNEY

United States Patent Office 2,876,080
Patented Mar. 3, 1959

2,876,080

APPARATUS FOR TREATING GASES

Joseph P. Ruth, Denver, Colo.

Application January 17, 1957, Serial No. 634,700

4 Claims. (Cl. 23—284)

As a development from and a practical extension of the disclosures of my application for patent of the United States, Serial No. 528,207, filed August 15, 1955, and in expansion of the utility and applicability of the method evidenced by Letters Patent of the United States No. 2,611,680 issued to me under date of September 23, 1952, this invention relates to methods and to apparatus for the treatment of gases and vapors, and has as as object to provide novel techniques and means effectively employable for the treatment of diverse gases and vapors to the realization of various particular purposes.

A further object of the invention is to provide an improved method operable to recover valuable by-products from certain types of gases and vapors.

A further object of the invention is to provide a novel method efficiently applicable to the amelioration and purification of certain gases and vapors.

A further object of the invention is to provide novel and improved apparatus effective to treat and to modify gases and vapors passed therethrough.

A further object of the invention is to provide novel and improved apparatus for the treatment of gases and vapors which is expediently adaptable to employment in various modifications and multi-unit combinations of advantageous utility.

A further object of the invention is to provide novel and improved apparatus for the treatment of gases and vapors that is relatively inexpensive of production and operative installation, that is operable to give effect to established principles of gas and vapor treatment with facility and economy, that is susceptible of ready adaptation to effect desired treatment of a particular gas or vapor, that is effective through the agency of inexpensive, commonly-available reactants with minimum consumption thereof, that is operable through long periods of continuous use with minimum maintenance requirements, and that is durable and long-lived in exposure to normally-corrosive agents.

With the foregoing and other objects in view, my invention consists in the nature and sequential relation of steps constituting a method and in the construction, arrangement, and operative combination of elements comprising apparatus for the practice of such method, all as hereinafter set forth, pointed out in my claims, and represented by the accompanying drawings, in which—

Figure 1 is a vertical section axially through an apparatus unit appropriate to give effect to certain applications of the novel method and typically exemplifying the structural novelties characterizing the invention.

Figure 2 is a cross section taken substantially on the indicated line 2—2 of Figure 1.

Figure 3 is a cross section taken substantially on the indicated line 3—3 of Figure 1.

Figure 4 is a cross section taken substantially on the indicated line 4—4 of Figure 1.

Figure 7 is a schematic showing of the multi-unit apparatus according to Figure 5 as adapted to advantageously supplement a conventional nitrogen fixation process.

Figure 5:
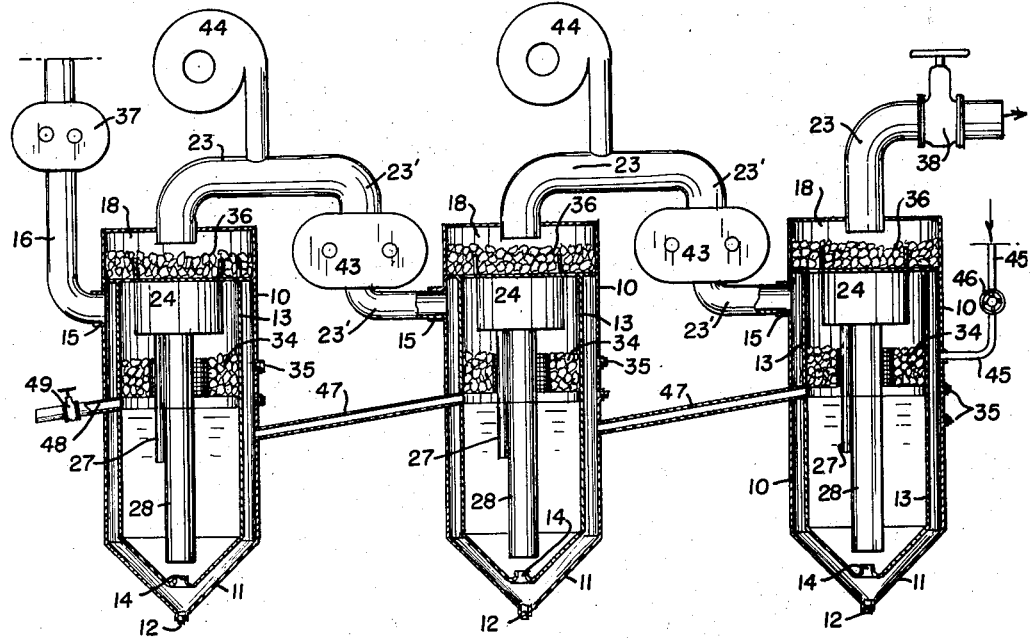
Figure 5 is a diagrammatic representation of a multi-unit apparatus organization within the contemplation of the invention for practice of the novel method as applied for desired particular results.

As elaborated in my patent above noted, conditioning of internal combustion engine gases, and the like, for suppression of their noxious and irritant properties efficiently results from wetting of the gases and flow of the resulting wet gases and gas-water mixtures through intersticed beds of diffusing material, such as limestone, normally insoluble in water and reactive to the characteristic acidity of the wet gases and mixtures, all in a manner to continuously wet and wash the material of the beds, to separate the gases and vapors from entrained water, and to return the latter for recirculation with incoming gas and vapor flow. In connection with the practice of such method, it has been determined that repetitious expansion of the gas and vapor flow under treatment as an incident of flow travel through the diffusing beds enhances and stimulates the corrective results inherent in the method, as is exemplified in my pending application above identified. It is now established that the principles of the patented method are adaptable to the treatment of gases and vapors other than those from internal combustion engines for the amelioration and purification thereof, or, either simultaneously or alternatively, for the recovery therefrom of valuable by-products. Incident to extension and enlargement of the utility of the patented method as above discussed, it has been determined that advantage in the practice of the original method and realization of the purposes of the method as expanded are attainable through reorganization and amplification of the apparatus disclosed in the pending application referred to hereinabove, hence the instant application is directed to a disclosure of the expanded method and to the provision of apparatus wherethrough the advantages of the concepts peculiar to the invention may be realized.

Gas treatments to which the principles and improvements of the instant invention apply with advantage are those characterized by washing of the gas with and through water to dissolve soluble constituents of the gas in the water, to generate gas-water mixtures, and to react the resulting solutions and mixtures with appropriate agents for ameliorative modification of the gas or for recovery of desired gas components, either or both. As is well understood, the effectiveness of such treatments is a function of the facility with which and the degree to which the gas constituents to be modified by the treatment mix with or dissolve in the water under the influences and conditions characterizing the treatment. Factors consequential to efficient generation of gas-water mixtures and to optimum absorption of gas components by the solvent include the intimacy, persistence, and duration of gas-water contact as affected by gas pressure, gas velocity, gas dispersion, temperature, and surface tension of the solvent, certain of which factors interact, as is well known, and all of which factors are susceptible of regulation and control. It is established that certain constituents of exhaust and industrial gases, notably the oxides of nitrogen, evidence a water solubility proportional to the pressure under which the gas is exposed to the solution; input of the gas to water at elevated pressures resulting in an immediate and very substantial increase in the rate and amount of gas constituent absorption. Further, it is known that the resistance to gas absorption occasioned by the surface tension characteristics of water is substantially nullified as the solvent passes from liquid to vapor state and that such a transitional condition of the solvent may be continuously promoted through violent agitation of the liquid consequential upon circulation and recirculation of the gas therethrough. Supplementing the foregoing, the presence of an abundance of oxygen is known to promote and to enchance the reaction of dissolved and wetted gas constituents, such as the oxides of nitrogen, with agents to which they are appropriately presented, whereby to convert such constituents to non-corrosive, fully-soluble, salvageable forms. Hence, in the light of and to give practical effect to the considerations above discussed, the instant invention is directed to the provision of methods and apparatus appropriate for the practice thereof whereby and wherethrough to facilitate and to advantageously enhance the ameliorative treatment and industrial processing of diverse gases.

As represented by Figures 1, 2, 3 and 4, a conditioner unit appropriate for practice of the patented method and primary to arrangements for the practice of the expanded method is shown as characterized by an axially-elongated, right-cylindrical, hollow shell 10 formed with a downwardly-convergent, conical bottom closure 11 furnished with an apical outlet normally closed by a removable plug 12, which shell is adapted to be supported in any expedient manner with its axis vertical. A second shell 13 spacedly parallels the shell 10 and bottom closure 11 internally thereof in sealed engagement at its upper end with the upper end of the shell 10, whereby to define an annular chamber between the shells 10 and 13 and a communicating conical chamber between the bottom closure 11 and the corresponding lower end of the shell 13, from which connecting chamber access to the interior of the shell 13 is provided through a thimble 14 directed as an open channel upwardly from the apex downwardly terminating the lower end of said shell. The chambers defined between the shells 10 and 13 are provided to initially receive the gases and vapors to be treated by the apparatus, to which end an intake 15 opening through the shell 10 adjacent the upper end thereof is arranged for coaction with the output end of a flow line 16 leading from the source or supply of the gas or vapor to be treated.

Secured, as by means of bolts 17, in superposed, closing relation with and fully across the upper end of the shell 10 and 13 organization, a cylindrical chamber 18, of an axial length much less than that of the combined shells, is formed with an annular skirt 19 upstanding interiorly and concentrically thereof in fixed relation with the chamber floor 20 a distance on the order of one-half the axial length of the chamber, and with a central outlet 21 opening through the top 22 of the chamber for coaction with an outflow line 23 in a usual manner. Opposed to and in substantial registration with the skirt 19, a cylindrical hood 24 fixedly depends from the floor 20 of the chamber 18 interiorly of the shell 13 in an inward spacing from said shell, and ports 25 open in any expedient number and arrangement through the chamber floor 20 exteriorly about the skirt 19 to establish communication between the interior of the chamber 18 and the space between the hood 24 and adjacent wall areas of the shell 13. Other ports 26 intersect the area of the chamber floor 20 circumscribed by the skirt 19 in an arrangement symmetrical with respect to the chamber axis, and tubes 27 are fixed to and depend from the chamber floor 20 is registration with the apertures 26 parallel to the axis of the shell and chamber assembly, which tubes 27 entirely traverse the hood 24 in a spacing inwardly therefrom and extend well below said hood to terminate below the midheight of the shell 13. Supported by and in fixed relation with the tubes 27, a tubular conduit 28 is disposed within and coaxially of the shell 13 in consequent axial alignment with the thimble 13 and hood 24. The conduit 28 is open at both ends and provided in a length such as to register its open lower end with and at a moderate spacing above the upper end of the thimble 14 when the open upper end of said conduit is received within and terminates above the plane defining the lower margin of the hood 24. Inhibitive of flow downwardly through the thimble 14 while accommodating flow upwardly therethrough, a ball 29 is disposed within the conduit 28 to seat at times on and in closing relation with the upper end of the thimble, and spaced fingers 30 fixedly diverging upwardly and outwardly from the upper end of the thimble 14 past the lower end of the conduit 38 function to direct the ball 29 to its seat on the thimble 14, while other fingers 31 fixedly upstanding from and beyond the upper end of the conduit 28 between the tubes 27 operate to inhibit escape of the ball 29 from its travel path longitudinally of the conduit.

The hood 24 depends within the shell 13 a distance on the order of one-fourth the height of said shell, and an annular baffle 32, of reticulate or foraminous material, is fixedly supported in any appropriate manner transversely of the shell 13 in a substantial spacing below the lower end of the hood 24 and above the lower end of the tubes 27 to obstruct the space between the shell wall and a circle circumscribing said tubes, and at the inner margin of said baffle 32 a cylindrical retainer 33 of reticulate or foraminous material upstands toward the hood 24 exteriorly about the tubes 27. The retainer 33 terminates in spaced relation with the lower end of the hood 24 and defines an open, unobstructed passage about the conduit 28 and between the tubes 27 wherethrough communication is had centrally of the baffle 32 between the upper and lower portions of the shell 13 defined by the baffle, and said retainer cooperates with the baffle 32 to complete an annular trough adapted to receive an intersticed, diffusing charge 34 of appropriate material, such as broken limestone, in the path of gravity-induced circulation from the chamber 18 through the ports 25 and from the overhanging area of the hood 24. Provided with a longitudinally-spaced succession of normally-plugged inlets 35 opening through a wall of the shell 10 in suitable correlation with the baffle 32 through which liquid may be introduced to the shell assembly to stand therein at a determinable level above, below, or substantially coincident with the baffle 32, and with an intersticed diffusing charge 36 of appropriate material, such as broken limestone, partially filling the chamber 18 both interiorly and exteriorly of the skirt 19 in a depth exceeding the axial length of the skirt, the unit is conditioned to function for the treatment of certain gases and vapors, particularly those from internal combustion engines, delivered thereto through the line 16.

Constructed as shown and described, the unit according to Figures 1–4, inclusive, is operable to give practical effect to the method described in my patent above noted in substantially the same manner as characterizes the apparatus disclosed in my above-identified pending application, whereby to condition engine gases for discharge free from noxious and irritating properties. With the shell assembly charged with water to stand both interiorly and exteriorly of the shell 13 at a level above the lower ends of the tubes 27, gas incoming through the line 16 under the normal pressure of its discharge flow fills the space between the shells 10 and 13 and therein develops a pressure operable to clear the water from said space through transfer upwardly of the thimble 14 and past the ball 29 to the interior of the shell 13, whereafter flow of gas rises through said thimble to be received within and upwardly traverse the conduit 28 and the water continually supplied thereto from the shell 13 through the conduit lower end, whereby the gas flow is thoroughly wetted and partially dissolved with consequent generation of gas-water mixtures. In reaction to the input of gases through the thimble 14, water from the lower portion of the shell 13 interior is elevated with the gases and resulting gas-water mixtures through the conduit 28 to discharge with consequent expansive effect from the upper end of said conduit interiorly of the hood 24. There being no outlet from the hood 24 save through the open lower end thereof, said hood operates to reverse the direction of gas and solution flow for return of the liquid component of the flow to the portion of the shell 13 interior below the baffle 32 and in large measure through the diffusing charge 34 carried by the latter subjacent the hood, whereby to wash and wet said charge and to react acidic properties of the solution therewith as an incident of liquid circulation and recirculation responsive to the gaseous input. Any tendency of solution to collect and to be retained on the charge 34 in obstructing relation with outflow from the hood 24 is obviated by the open passage about the conduit 28 within the retainer 33, and any gases or vapors seeking outlet from the lower portion of the shell 13 interior exteriorly of the conduit 28 are constrained by return flow of solution from the hood 24 to traverse the charge 34 exteriorly about such flow for consequent suppression of their acidic properties. The gases and vapors characterizing the discharge from the upper end of the conduit 28 resist entrainment with the return flow of solution and escape thence about the lower end of the hood 24 to expand within and rise through the annular space between said hood and the upper portion of the shell 13 whence they pass, in cooled, moist condition, through the ports 25 to traverse the consequently-wetted charge 36 of the chamber 18 where they are scrubbed, further cooled, reacted and dewatered as they move to discharge from the apparatus through the outflow line 23; solution removed from the gas and vapor flow which might otherwise collect within the chamber area bounded by the skirt 19 being returned to the lower portion of the shell 13 interior through the ports 26 and tubes 27.

Automatically operable solely in reaction to the input pressures of the gases to be treated, the apparatus shown in Figures 1–4, inclusive, and above described effectively applies the method of my patent above noted to condition internal combustion engine exhaust gases for discharge within confined spaces free from properties inimical or irritating to humans. However, it has been determined that the effectiveness of the patented method for the treatment of engine exhaust gases may be enhanced and the utility of such method for the treatment of other gases and vapors may be extended through simple and practical enlargement thereof in a manner expedient of practice through adaptation of the described apparatus as represented by Figure 6.

Figure 6:
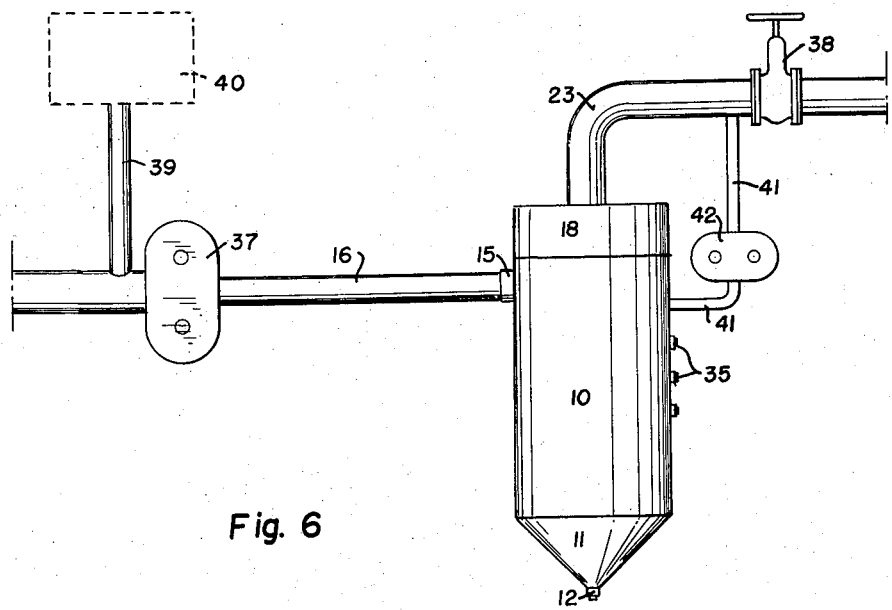
Figure 6 is a diagrammatic representation of yet another arrangement of the novel apparatus effective for the practice of the novel method.

The apparatus unit typified by its outer shell 10 is conveniently arranged to establish and to maintain a regulable elevated pressure characterizing the gas under treatment therein, whereby to promote and to enhance water absorption of the soluble gas constituents, a simple organization effective to such end being represented in Figure 6 as a powered pump 37, of any suitable type and construction, in and acting through the line 16 to augment to any desired degree the pressure of the gas flow input to the treating unit and a control valve 38, of appropriate conventional type, in and for adjustable regulation of flow through the outflow line 23. With gas to be treated supplied to the intake of the pump 37 while the latter is operating, it is obvious that adjustment of the valve 38 may be applied to establish and to maintain within the apparatus unit any desired degree of gas pressure within the capacity of the pump. The arrangement just described may readily be utilized to realize the advantages of treating the gas in the presence of an abundance of oxygen, it being expedient and entirely practical to connect the inflow line 16 at the intake side of the pump 37 by means of a line 39, or the equivalent, with a source or supply 40 of air, oxygen, or the like, whereby to induce input of oxygen to the gas flow for compression therewith by the pump 37. Promotive of the advantages of intimate gas-water contact, recirculation of the gas through the solvent, and reduction of surface tension resistance through generation of a continuous cycling of the water through and between its liquid and vapor states in contact with the gas flow interiorly of the unit, a by-pass line 41 connects through a powered pump 42 between the outflow line 23 at the same side of the valve 38 as said unit and the space separating the shells 10 and 13 of the latter, whereby operation of said pump 42 is effective to divert determinable fractions of the outflow through the line 23 back to and for recirculation through the unit with consequent enhanced agitation and repetitious circulation of the unit solution charge.

Manifestly, a plurality of like apparatus units typified by the outer shell 10 may be associated and interconnected as a multi-unit battery for the repetitiously successive application of the improved methods to the treatment of gases and vapors progressively traversing the same, and such a battery may be organized in the manner represented by Figure 5 for continuous operations directed particularly to the recovery of desired gas constituents amenable to absorption by water under the influence of the methods distinguishing the gas treatments of the instant invention. The multi-unit adaptation represented by Figure 5 is comprised from any desired number of the like units typified by the outer shell 10, three such being illustrated, arranged in axially-vertical, spaced, parallel relation with their corresponding transverse members in a common horizontal plane. Input of the gas or vapor to be treated is had to the unit at one end of the series through a line 16 furnished with a pump 37 as above explained, it being feasible, if desired, to supply air or oxygen to the gas inflow through the arrangement shown in Figure 6, and outflow of the treated gas and vapors is had through the line 23 under the control of a valve 38 operatively associated with the unit at the other end of the series. The successive units of the assembly are interconnected for flow of the gas or vapor under treatment progressively therethrough by means of a flow line extension 23' continuing the outflow line 23 of a preceding unit through a powered pump 43 to connection with the intake 15 of the next succeeding unit, whereby to expose the gas or vapor to treatment in each of said units under elevated pressure in the manner and for the purposes hereinabove set forth, any desired additions of air or oxygen being supplied by means of pumps 44 adapted for intake of air or oxygen in any expedient arrangement and for delivery of such intake under elevated pressure to each of the lines 23 at the intake side of the associated pump 43. Thus is provision made for circulation of the gas or vapor under elevated pressure and in the presence of an abundance of oxygen successively through and with violent agitation of solution within each of the units of the battery for repetitious, intimate gas-water contact productive of maximum reaction of the gas components with the limestone charges, maximum absorption of soluble gas constituents by the water, and substantial elimination of the corrosive factors of the resulting solution. The battery of interconnected units is organized for continuous operation and for recovery of the dissolved gas constituents through the provision of a liquid flow circuit common to said units in counter-flow relation with the gas flow circuit and effective to maintain substantially uniform liquid charges in the several units. In any appropriate particularity of structure, the liquid flow circuit is characterized by a water input line 45 leading from a suitable source or supply of water through a flow control valve 46 to deliver to the space between the shells 10 and 13 of the unit terminating the battery in the direction of gas flow, gravity flow lines 47 similarly connecting at a slight inclination to the horizontal between an intake end opening through the shell 13 of each unit immediately subjacent the baffle 32 thereof and a lower end delivering to the space between the shells 10 and 13 of the unit next preceding in the direction of gas flow, and a gravity flow line 48 furnished with a flow control valve 49 leading from the shell 13 of the unit in which the gas is first received in a relationship the same as that of the lines 47 for direction of outflow therethrough to subsequent processing or disposition. Obviously, the liquid flow circuit functions under supply through the line 45 to charge each of the units with water to the uniform level established by the intake ends of the lines 47 and 48 and to maintain a flow of solution counter-current to the gas flow from a zone of high solution concentration in each unit to and for circulation through the unit next preceding in the direction of gas flow, or, to discharge from the battery. Once the battery units have been charged with water to fill the liquid flow circuit, inflow through the line 45 is reflected as corresponding outflow through the line 48 at a rate susceptible of regulation by means of the valve 46; the valve 49 being available for regulation, in an obvious manner, of the level common to the liquid charges of the units above that minimum common to the intake ends of the lines 47 and 48.

As indicated by Figure 7, the improvements of the instant invention are applicable with advantage to the conventional fixation of nitrogen by means of the electric arc furnace, it being feasible and eminently practical to introduce the gas feed to the furnace 50 through a powered pump 51, whereby to elevate the pressure of and to promptly cool the gas output from the furnace, oxides of nitrogen, routed through the line 16 to the leading unit of the battery organized as shown in Figure 5. As should be readily apparent, the output from the furnace 50 is processed through the units of the battery to development of recoverable nitrates in the solution outflow.

The methods of gas and vapor treatment inherent in the arrangements and operations above discussed are distinguished by intimate and repetitious gas-water contact under regulable pressure in the presence of a regulable supply of oxygen, repetitious expansion and dewatering of the gas and gas-water mixtures, repetitious exposure of the soluble gas constituents to contact with water at minimum or zero surface tension, suppression of acidic properties of the gas, mixtures, and solutions as a result of their diffusion through limestone constantly wetted and washed as an incident of the gas circulation, and expedient segregation of the soluble gas constituents in form for facile recovery.

I claim as my invention:

1. Apparatus for the treatment of gases and vapors comprising an outer, downwardly-convergent shell adapted to confine a charge of water, a similar inner shell coaxially, interiorly, and spacedly cooperating with said outer shell to define therebetween a chamber closed at its upper end, a passage and an associated check valve at the lower end of said inner shell disposed to accommodate flow from said chamber to the interior of the inner shell and to inhibit counter flow, a chamber adapted to house alkaline diffusing material closing the upper end of said inner shell in communication with the interior thereof, an outflow line serving said latter chamber through a flow control valve, a line for the input of gases and vapors serving said first chamber through a powered fluid pressure pump, means interiorly of said inner shell reactive to pressure inflow through said passage to effect agitation, circulation, and recirculation of water partially filling said shells in intimate contact with gases and vapors input to said first chamber, and other means interiorly of said inner shell adapted to support alkaline diffusing material in the path of such circulation and recirculation.

2. Apparatus for the treatment of gases and vapors comprising an outer, downwardly-convergent shell adapted to confine a charge of water, a similar inner shell coaxially, interiorly, and spacedly cooperating with said outer shell to define therebetween a chamber closed at its upper end, a passage and an associated check valve at the lower end of said inner shell disposed to accommodate flow from said chamber to the interior of the inner shell and to inhibit counter flow, a chamber adapted to house alkaline diffusing material closing the upper end of said inner shell in communication with the interior thereof, an outflow line serving said latter chamber through a flow control valve, a line for the input of gases and vapors serving said first chamber through a powered fluid pressure pump, means interiorly of said inner shell reactive to pressure inflow through said passage to effect agitation, circulation, and recirculation of water partially filling said shells in intimate contact with gases and vapors input to said first chamber, other means interiorly of said inner shell adapted to support alkaline diffusing material in the path of such circulation and recirculation, and a return flow line leading through a powered fluid pressure pump from a point of said outflow line between the chamber and valve therewith associated to delivery to the chamber between said inner and outer shells.

3. Apparatus for the treatment of gases and vapors comprising a succession if like units disposed with their corresponding horizontal elements coplanar, each of said units being characterized by spacedly-parallel inner and outer shells intercommunicating through the lower end of the inner shell, an input line adapted to deliver to the space between said shells, a chamber adapted to house alkaline material closing the upper end of the inner shell in communication with the interior thereof, an outflow line from said chamber, and means interiorly of the inner shell reactive to pressure input of fluids thereto to effect agitation, circulation, and recirculation of the fluids within the shell in contact with alkaline material supported therein, a powered fluid pressure pump in the input line serving the unit first in said succession, a flow control valve in the outflow line of the unit last in said succession, a flow connection through a powered fluid pressure pump between the outflow line of each preceding unit and the input line of the adjacent succeeding unit, whereby to provide for flow of gases and vapors under regulable pressure through the successive unit assembly, a water supply line delivering through a flow control valve to the space between the shells of the unit last in the succession, gravity flow lines similarly connecting at a slight downward inclination between the mid-height of the inner shell of a trailing unit of the succession and the space between the shells of the adjacent preceding such unit, and a corresponding gravity flow line leading from the first unit of the succession through a flow control valve for regulation and direction of solution outflow from the unit assembly, whereby to provide for regulatable flow of water through the assembly counter to the direction of gas and vapor flow.

4. Apparatus for the treatment of gases and vapors comprising a succession of like units disposed with their corresponding horizontal elements coplanar, each of said units being characterized by spacedly-parallel inner and outer shells intercommunicating through the lower end of the inner shell, an input line adapted to deliver to the space between said shells, a chamber adapted to house alkaline material closing the upper end of the inner shell in communication with the interior thereof, an outflow line from said chamber, and means interiorly of the inner shell reactive to pressure input of fluids thereto to effect agitation, circulation, and recirculation of the fluids within the shell in contact with alkaline material supported therein, a powered fluid pressure pump in the input line serving the unit first in said succession, a flow control valve in the outflow line of the unit last in said succession, a flow connection through a powered fluid pressure pump between the outflow line of each preceding unit and the input line of the adjacent succeeding unit, whereby to provide for flow of gases and vapors under regulable pressure through the successive unit assembly, a water supply line delivering through a flow control valve to the space between the shells of the unit last in the succession, gravity flow lines similarly connecting at a slight downward inclination between the mid-height of the inner shell of a trailing unit of the succession and the space between the shells of the adjacent preceding such unit, and a corresponding gravity flow line leading from the first unit of the succession through a flow control valve for regulation and direction of solution outflow from the unit assembly, whereby to provide for regulable flow of water through the assembly counter to the direction of gas and vapor flow; together with a return flow line leading through a powered fluid pressure pump from a point of the outflow line of the unit last in the succession between the chamber and valve therewith associated to delivery to the space between the inner and outer shells of said unit.

References Cited in the file of this patent
UNITED STATES PATENTS

| | | |
|---|---|---|
| 2,045,653 | Hoyt | June 30, 1936 |
| 2,677,601 | Ruth | May 4, 1954 |
| 2,768,881 | Ruth | Oct. 30, 1956 |